United States Patent [19]

DeBell

[11] 4,203,089
[45] May 13, 1980

[54] ELECTRO-HYDROACOUSTIC TRANSDUCER

[75] Inventor: David A. DeBell, Annapolis, Md.

[73] Assignee: Westinghouse Electric Corp., Pittsburgh, Pa.

[21] Appl. No.: 965,015

[22] Filed: Nov. 30, 1978

[51] Int. Cl.² ............................................. H04B 13/00
[52] U.S. Cl. ................................. 367/143; 181/120; 340/404; 116/137 R
[58] Field of Search ............. 181/120, 110, 139, 142; 340/8 PC, 8 FT, 8 R, 12 R, 388, 404; 116/137 R; 73/632, 665

[56] References Cited

U.S. PATENT DOCUMENTS

| 2,773,482 | 12/1956 | Dickie | 73/665 |
|---|---|---|---|
| 2,792,804 | 5/1957 | Bouyoucos et al. | 340/12 R |
| 3,212,473 | 10/1965 | Bouyoucos | 116/137 R |
| 3,275,977 | 9/1966 | Bouyoucos | 340/15 |
| 3,349,367 | 10/1967 | Wisatsky | 340/12 R |
| 3,382,841 | 5/1968 | Bouyoucos | 116/137 R |
| 3,392,369 | 7/1968 | Dickie et al. | 340/12 R |
| 3,461,910 | 8/1969 | Selsam et al. | 137/624.15 |
| 3,978,940 | 9/1976 | Bouyoucos | 181/120 |
| 4,047,148 | 9/1977 | Hagemann | 340/12 R |

OTHER PUBLICATIONS

Wallen et al., "Appres: A Very Low . . . System," 9/24/70, pp. 17-19, IEEE Conf. on Engineering in the Ocean Environment, Panama City, Fla.

Primary Examiner—Nelson Moskowitz
Attorney, Agent, or Firm—D. Schron

[57] ABSTRACT

An underwater transducer which includes a fluid circuit having a valve disposed in a plenum chamber having a small aperture open to the ambient water pressure. Fluid flow into and out of the chamber by way of the valve is governed by controlling the valve opening and closing in accordance with movement of an electrodynamic driver which receives an input signal to be transmitted.

14 Claims, 7 Drawing Figures

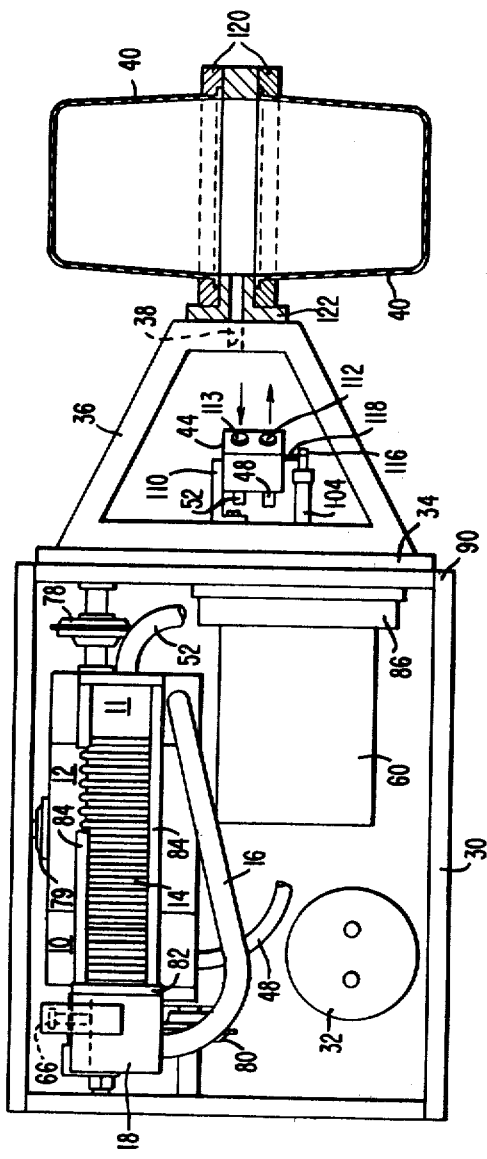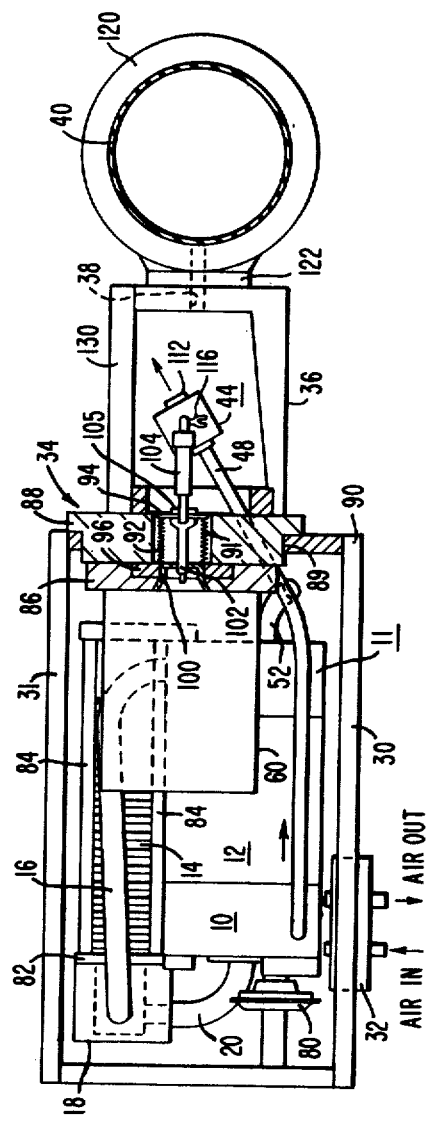

ELECTRO-HYDROACOUSTIC TRANSDUCER

GOVERNMENT CONTRACT

The Government has rights in this invention pursuant to Contract No. N00024-C-7220 awarded by the Department of the Navy.

BACKGROUND OF THE INVENTION

1. Field of the Invention

The invention in general relates to transducers, and particularly to an electro-hydroacoustic projector for underwater use.

2. Description of the Prior Art

For various underwater applications, a need exists for a relatively low frequency acoustic projector operable over a relatively wide bandwidth.

In one type of commonly used transducer, the electro-hydroacoustic transducer, high-pressure working fluid is operable to move a radiating element, such as a piston, in accordance with a signal to be transmitted. The high-pressure fluid flow is modulated by means of a valve such as a spool valve movable about a center position and whose movement is governed by an electrodynamic driver which receives an input electrical signal. Thus, an input electrical control signal governs the movement of a large piston radiator.

To accommodate the high-pressure fluid flow necessary to move the relatively large piston, such systems are built to extremely close mechanical tolerances. Any foreign objects which may enter the fluid circuit can cause disruption of proper operation and accordingly various filters must be used in such systems. The use of filters requires periodic replacement, and additionally they are not 100 percent effective against foreign bodies.

Further, the pressures generally utilized may be thousands of psi and the fluid circuit requires rather demanding sealing arrangements to maintain proper operation.

The present invention may be operated at relatively low fluid pressures and completely eliminates the requirement for a relatively large piston radiating member, thus allowing the construction of a much smaller transducer.

SUMMARY OF THE INVENTION

The present transducer has a fluid circuit which includes both a supply and return pump, a valving means, and an accumulator means connected between the supply and return pumps. The transducer further includes a plenum chamber which has an aperture open to the ambient water pressure and if the working fluid is other than seawater, a flexible bladder may be included as an interface between the working fluid and ambient water. The use of working fluid flow into and out of the ambient medium (or into and out of the bladder) results in a transducer which acts as a monopole radiator.

The valving means is located within the plenum chamber and includes a discharge port for discharging the fluid from the supply pump into the chamber and an intake port for returning the fluid in the chamber back to the return pump. An electrodynamic drive means receives an input electrical signal and is connected to the valving means to regulate its discharge and intake operation as a function of the input electrical signal. The pumps and the accumulator are positioned within a gas filled container and means are provided for maintaining the interior of the container substantially at the ambient water pressure.

BRIEF DESCRIPTION OF THE DRAWINGS

FIGS. 3A and 3B are respective side and plan views, partially in section, illustrating various components of the transducer of the present invention;

DESCRIPTION OF THE PREFERRED EMBODIMENT

Figure 1:
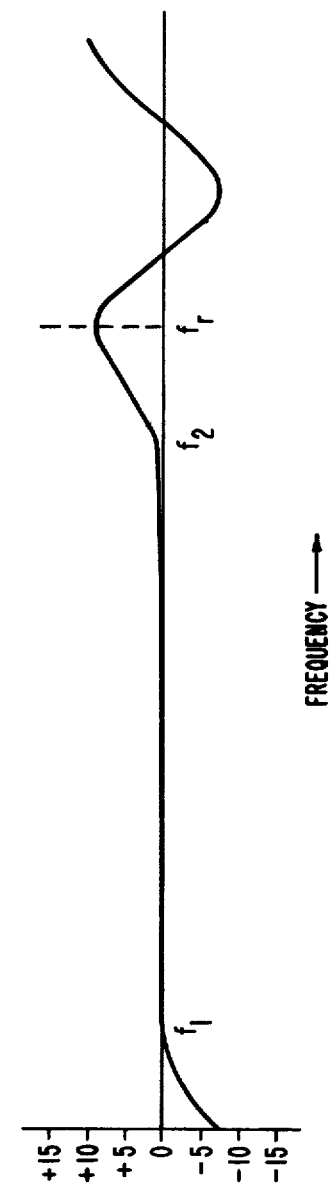
FIG. 1 illustrates a typical response characteristic of the transducer of the present invention.

In FIG. 1, transducer response plotted with respect to some arbitrary reference, in decibels, is plotted as a function of frequency. The device is operated below resonance, indicated as $f_r$ and it is seen that the response is relatively flat over a wide frequency range from $f_1$ to $f_2$ after which roll-off occurs at $f_r$. A low frequency operation is desired and by way of example the transducer may be designed to operate from around 10 hertz to several hundred hertz.

Figure 2:
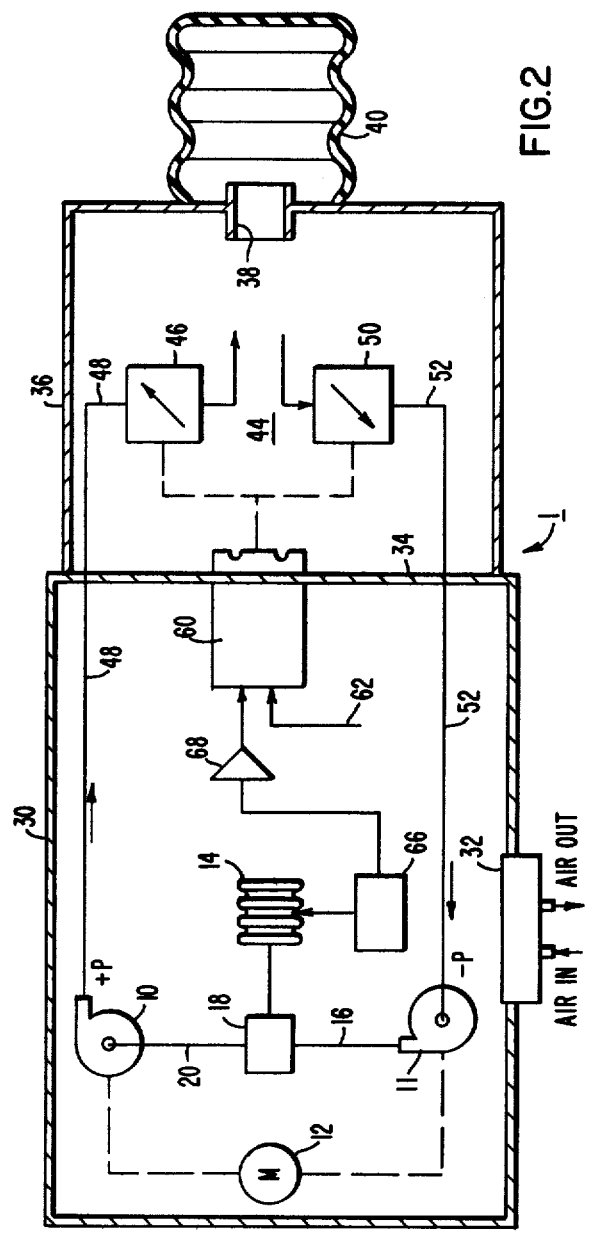
FIG. 2 is a schematic diagram of one embodiment of the present invention.

FIG. 2 is a schematic illustration of one embodiment of the present invention. The transducer 1 has a fluid circuit which includes a supply pump 10 and a return pump 11, both operated from a common motor 12. A flexible fluid accumulator 14 is located in the fluid circuit between supply and return pumps 10 and 11 and accumulator 14 is provided with fluid from the return pump 11 by way of fluid conduit 16 and manifold 18, and fluid from accumulator 14 is provided to supply pump 10 by way of manifold 18 and fluid conduit 20.

These components are housed within a container 30 which is gas filled and maintained at substantially the ambient water pressure. This is accomplished for example by the provision of a gas control valve 32 which senses the difference in pressure between the inside of container 30 and the ambient water to allow gas, for example, from a compressed air supply, to enter the container or to allow the air in the container to be exhausted, depending upon the pressure conditions. Such gas control valves are well known to those skilled in the art.

Adjacent to container 30 and separated from it by an interface section 34 is a plenum chamber 36 which has an aperture 38 open to the ambient water pressure. A typical working fluid for the transducer might be a silicone oil and in order to conserve the fluid a flexible bladder 40 may be provided to separate the two fluids.

Disposed within the plenum chamber 36 is a valving means 44 which includes a first section 46 for discharging to the plenum chamber 36, fluid supplied by supply pump 10 by way of fluid conduit 48. Valving means 44 additionally includes a second section 50 for returning fluid from plenum chamber 36 back to the return pump 11 by way of fluid conduit 52.

A commercially available electrodynamic driver 60 is provided to control the valving means 44 in accordance with an input signal on line 62. The sections of the valve are caused to open and close in accordance with the input signal, thus causing a modulation of the pressure and fluid flow into and out of aperture 38, resulting in monopole radiation. Operation of the system may be analogized to class A operation in that in the absence of any input signal there is a continuous fluid flow in the fluid circuit by means of supply and return pumps 10 and 11. This is the quiescent or static condition which is then modulated by virtue of the input electrical signal, this modulation around the quiescent or biasing state being the dynamic condition.

The static pressure of the fluid supplied by supply pump 10 is designated +p (relative to the ambient pressure) and is a function of the design operating depth. For example, for a minimum operating depth of 100 feet, +p may be equal to 50 psi. The pressure at the inlet of the return pump 11 is −p, thus making the static pressure within accumulator 14 equal to the ambient pressure.

In order to maintain the accumulator in its static position, about which it is dynamically moved, the system includes a means for sensing the accumulator position. Accordingly, the accumulator position sensor 66 is responsive to the position or movement of the accumulator 14 to provide an output signal to the electrodynamic driver 60, after amplification in amplifier 68. The input of a DC (or very low frequency AC) signal to the electrodynamic driver 60 controls the valving means 44 to cause a variation in the static pressure, resulting in an adjustment of the accumulator 14 to its desired neutral position.

FIG. 3A is a side view, partially in section, of a transducer built in accordance with the teachings of the present invention, and FIG. 3B is a plan view with the respective cover portions 31 and 130 to the container and plenum chamber removed. Components schematically illustrated in FIG. 2 have been given like reference numerals in FIGS. 3A and 3B.

As seen in these figures, by way of example, the supply pump 10 and return pump 11 are colinearly arranged on either side of the drive motor 12. The three units are positioned within container 30 by means of vibration isolation mounts 78, 79 and 80. Manifold 18 is connected by means of bracket 82 to the upper part of supply pump 10 and a plurality of rods 84 extending from the bracket contain the accumulator 14 in the form of a flexible, metallic bellows.

Various position sensors, such as a linear variable differential transformer or sliding potentiometer connected to the bellows 14, may be utilized. FIG. 3B illustrates another type, a differential pressure sensor 66 which is operable to measure the difference in pressure within the container 30 and within the bellows 14, the resulting signal being indicative of accumulator position.

Driver 60 is connected by means of driver coverplate 86 to a subplate assembly 88 which passes through an aperture 89 and is fastened to side wall 90 of container 30. Subplate assembly 88 forms part of the interface section 34, separating the container 30 from the plenum chamber 36. Subplate assembly 88 includes an aperture 91 in which is positioned a metal bellows 92 having at one end thereof a piston member 94, and at the other end thereof a bellows seal assembly 96 between driver coverplate 86 and subplate assembly 88.

A portion of the driver is cut away to show the movable element 100 which is caused to move axially in response to an input signal to the driver. Movement of element 100 is translated to piston member 94 by means of the piston link 102 threadedly engaged with member 100 and contacting the inner side of piston 94. A rod member 104 passes through a central aperture in piston 94 and is threadedly engaged with piston link 102 and secured in place by means of nut 105.

Valving means 44 is positioned in plenum chamber 36 by means of bracket 110 (FIG. 3B) and is operable to discharge circulating fluid, from the supply pump 10, into the plenum chamber 36 by means of discharge port 112. Valving means 44 additionally includes an intake port 113 for returning fluid from the plenum chamber back to the return pump 11. Fluid is conducted to and from the valving arrangement 44 by means of fluid conduits 48 and 52 which pass through the subplate assembly 88.

Rod member 104 is connected by linkage 116 to shaft 118 of valving means 44. As will be explained subsequently, rotation of shaft 118 controls the discharge and intake function of the valving means which in turn, by virtue of the arrangement illustrated, is governed by the input signal to the electrodynamic driver 60. In order to aid in maintaining a flat response over a wide frequency range, the present invention utilizes a force feedback arrangement. Bellows 92 which separates the fluid in plenum chamber 36 from the air in container 30 is of the type which has a small spring constant. That is, it appears as a soft, rather than a stiff, spring. Let it be assumed that current is put into the driver 60 which results in an opening of valve means 44 to discharge more fluid into plenum chamber 36. The discharge of more fluid in turn results in a greater pressure within the plenum and which pressure acting on the piston 94 causes a reaction against the force due to the current. This is analogous to negative feedback in an amplifier and effectively acts as a damper to prevent resonance at the spring mass constant of the system. The amount of feedback, and accordingly the overall response of the system, is governed in part by the aperture 38, which acts as a fluid inertance (analogous to electrical inductance). The pressure feedback force on the piston 94 is a function of the cross-sectional area (A) and length (l), of the aperture 38. The inertance I is given by the formula $I = \rho l/A$, where $\rho$ is the fluid density.

In general, it is desired that plenum chamber 36 be as small as practical since the smaller the plenum, the higher will be its resonant frequency, and accordingly, the higher will be the rolloff portion, such as $f_r$ illustrated in FIG. 1.

Fluid flows into and out of aperture 38 and into and out of bladder 40. Bladder 40 is connected to bladder retaining rings 120 which in turn are connected to a bladder mounting 122 secured to the front end of plenum chamber 36.

As seen in FIG. 3B, plenum chamber 36 is designed such that there are no parallel vertical wall portions. The generally truncated triangular shape insures against any reinforced resonances which may occur if opposite walls were parallel and at a distance of one-half wavelength of the acoustic wave in the circulating fluid medium. Additionally, if desired, the inner surface of cover member 130 and the floor portion of plenum chamber 36 (FIG. 3A) may also be made nonparallel.

Figure 4:
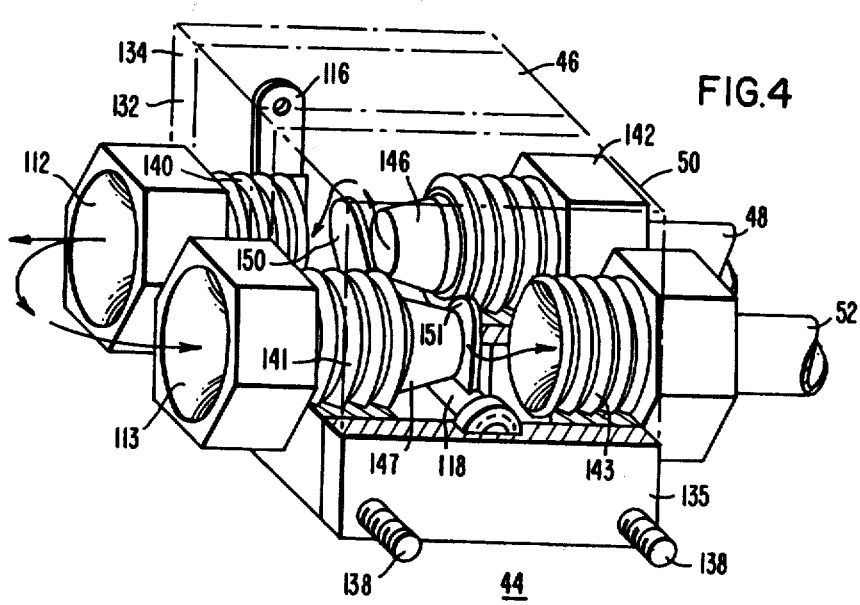
FIG. 4 is a view with portions broken away and partially in section of a preferred valving means.

A preferred form of valving means 44 is illustrated in FIG. 4, with portions broken away to show the interior thereof. The first and second sections 46 and 50 are independent chamber structures separated by a wall 132. The outer ends of the chamber structures are covered by end plates 134 and 135 and the whole assembly is secured by means of four bolts 138 (the upper two are not illustrated for clarity). The discharge port 112 and intake port 113 are part of respective fittings 140 and 141 aligned opposite respective fittings 142 and 143. Fittings 141 and 142 have respective nozzle portions 147 and 146.

In the quiescent operating condition of the transducer, fluid in the fluid circuit normally flows from the supply pump 10 through conduit 48 into fitting 142, past nozzle 146, into fitting 140 and out discharge port 112. Fluid is returned by way of intake port 113 through the fitting 141 past nozzle 147 into fitting 143 and back to the return pump 11 by way of conduit 52. This normal flow is modulated by means of flaps 150 and 151 connected to shaft 118 and disposed at a slight angle relative to one another. Shaft 118 passes through an aperture in wall 132 and is connected to bearing 154 in end plate 135. The shaft is caused to rotate by its connection to linkage 116 which has the effect of moving flaps 150 and 151 closer to or further away from respective nozzles 146 and 147. Movement of the flap which can result in full flow or full cutoff of fluid discharged from the respective nozzles is translated into dynamic pressure variations, giving rise to the acoustic radiation of the transducer. By virtue of the connection with the driver 60, as illustrated in FIG. 3A, these pressure variations are approximately proportional to the input electrical signal.

Figure 5A:
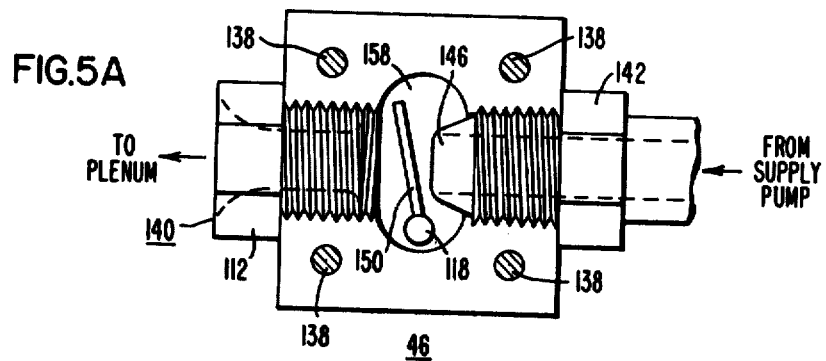
FIGS. 5A and 5B are further views, partially in section, of portions of the valving means illustrated in FIG. 4.
Figure 5B:
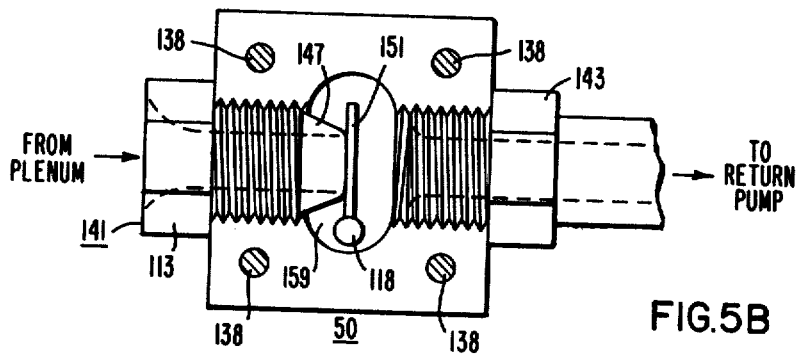

Side views of the respective sections 46 and 50 are illustrated in FIGS. 5A and 5B. Sections 46 and 50 are chamber structures which include respective chambers 158 and 159 for the passage of fluid from the nozzled fitting to its opposed fitting. Rotation of shaft 118 in a counterclockwise direction would tend to unblock nozzle 147 while simultaneously tending to close off nozzle 146. With an AC signal applied to the driver, shaft 118 is caused to rotate alternately in a clockwise and counterclockwise direction to effect a corresponding modulation of the fluid flow. This modulation varies the volumetric rate of change of fluid flow and the corresponding pressure variations are governed by this rate of change in addition to the aforementioned inertance.

I claim:

1. A transducer for use in a water medium comprising:
   (A) a fluid circuit including a supply pump, a return pump, valving means, and accumulator means connected between said supply and return pumps;
   (B) a plenum chamber having an aperture open to the ambient water pressure;
   (C) said valving means being positioned within said plenum chamber and including a discharge port for discharging the fluid from said supply pump into said plenum chamber, and an intake port for returning fluid from said plenum chamber back to said return pump;
   (D) electrodynamic drive means for receiving an input electrical signal and being operatively connected to said valving means to regulate its discharge and intake operation in accordance with said electrical signal;
   (E) a container for housing said pumps and accumulator means; and
   (F) means for maintaining the interior of said container substantially at the ambient water pressure.

2. Apparatus according to claim 1 which includes:
   (A) a flexible bladder positioned at said aperture for preventing contact of the circulating fluid with the ambient water.

3. Apparatus according to claim 1 wherein:
   (A) said plenum chamber has a plurality of side surfaces, no two of which are parallel to one another.

4. Apparatus according to claim 3 wherein:
   (A) said plenum chamber has top and bottom surfaces which are nonparallel.

5. Apparatus according to claim 3 wherein:
   (A) said plenum chamber has a generally truncated triangular shape in plan view.

6. Apparatus according to claim 1 wherein:
   (A) said plenum chamber is adjacent said container and is separated therefrom by an interface section.

7. Apparatus according to claim 6 wherein:
   (A) said interface section has an aperture therethrough;
   (B) said electrodynamic drive means having a movable element and being positioned within said container;
   (C) coupling means for coupling said movable element to said valving means for operation thereof;
   (D) means for preventing fluid flow from said plenum chamber to said container through said aperture in said interface section.

8. Apparatus according to claim 7 which includes:
   (A) feedback means for opposing movement of said movable element during fluid pressure changes in said plenum chamber.

9. Apparatus according to claim 8 which includes:
   (A) a movable flexible member disposed within said aperture in said interface section and coupled to said movable element;
   (B) said movable flexible member having a certain portion exposed to the fluid in said plenum chamber and upon which the fluid pressure acts to oppose movement of said movable element.

10. Apparatus according to claim 6 which includes:
    (A) fluid conduits which pass from said container to said plenum chamber through said interface section.

11. Apparatus according to claim 1 which includes:
    (A) means for sensing the position of said accumulator means to provide an output signal indicative thereof; and
    (B) means for applying said output signal to said electrodynamic drive means to vary the static pressure in said fluid circuit.

12. Apparatus according to claim 1 wherein said valving means includes:
    (A) first and second chamber sections separated by a common wall portion;
    (B) each said section including an intake fitting and a discharge fitting for introducing fluid into, and allowing fluid to exit from, said chamber section;
    (C) means for variably blocking fluid flow from the intake fitting to the discharge fitting of a chamber section.

13. Apparatus according to claim 12 wherein said means for variably blocking includes:
    (A) a shaft which extends through both said chamber sections and through an aperture in said wall portion;
    (B) first and second flaps connected to said shaft and disposed in respective first and second chamber sections;
    (C) said flaps being on said shaft at an angle relative to one another and being positioned in the fluid path between intake and discharge fittings.

14. Apparatus according to claim 12 wherein:
    (A) at least one of said intake or discharge fittings includes a nozzle portion within said chamber section.

* * * * *